United States Patent [19]

Maloney

[11] Patent Number: 5,696,490
[45] Date of Patent: Dec. 9, 1997

[54] FM (VHF) INFRARED WIRELESS DIGITAL METAL DETECTOR

[76] Inventor: Daniel P. Maloney, Rte. 1, Box 313G, 1163 120 St., Roberts, Wis. 54023

[21] Appl. No.: 714,458

[22] Filed: Sep. 16, 1996

[51] Int. Cl.[6] .................................................. G08B 13/10
[52] U.S. Cl. ...................... 340/555; 340/551; 250/341.4; 250/341.6; 342/433; 324/328; 324/334
[58] Field of Search ........................ 340/555, 573, 340/552, 567, 551; 250/331, 341.4, 341.6, 341.8; 342/433, 417, 419; 324/328, 327, 236, 237, 334, 329

[56] References Cited

U.S. PATENT DOCUMENTS

| | | | |
|---|---|---|---|
| 3,784,899 | 1/1974 | Chalfin | 324/334 |
| 3,823,365 | 7/1974 | Anderson | 324/328 |
| 4,323,847 | 4/1982 | Karbowski | 324/327 |
| 4,644,290 | 2/1987 | Bernzweig | 324/329 |

OTHER PUBLICATIONS

Kellyco Detector Distributors, The Gardiner Treasuretron C Model and The Gardiner Model 202A.

Kellyco Detector Distributors; The Gardiner Model 190C and The Gardener Model 230.

*Primary Examiner*—Jeffery Hofsass
*Assistant Examiner*—Davetta Woods

[57] ABSTRACT

A FM (VHF) infrared wireless digital metal detector is disclosed having a sealed aluminum radiation shield and dielectric case, with a infrared phototransistor detector and krypton bulb arranged to relay detection data to meter within a clustered instrument combination down in front of metal detector unit.

1 Claim, 3 Drawing Sheets

FM (VHF) INFRARED WIRELESS DIGITAL METAL DETECTOR

BACKGROUND OF THE INVENTION

The field of this invention relates generally to metal detectors, using a very high frequency (VHF)-FM propagated radio waves several hundred feet deep in the ground or less and responsive to detection of embedded or buried metal objects in the ground.

In regards to the background of the invention the prior art in most cases uses long cables to connect search coil to detector/transmitter, tuning is hard to do and discrimination is complicated. In some cases the prior art detection systems are so heavy the detector/transmitter box is disconnected from the unit and carried on a belt or supported with a harness from operaters body and visual contact with ground search and meter has to be repeatedly broken from search coil system making pin pointing objects hard to do. This also hampers high speed searching where the instrument is moved rapidly around obstacles. In many cases the instrument won't detect deep enough.

SUMMARY OF THE INVENTION

Accordingly, an important object of the present invention is to provide an efficient, uncomplicated, lightweight, FM-(VHF) metal detector with extreme sensitivity to propagated radio waves, several hundred feet deep into the ground or less.

Another object of the present invention is to have the combination of all the detection instruments clustered immediately down in front by the antenna system and to provide a easier visual technique with the infrared wireless digital meter down in front by the antenna system for easier guiding and pinpointing objects in the ground.

Another object of the present invention is to provide easier tuning and a greater number of tuning selections by providing the infrared wireless digital meter with no long cables and wires or a radio transmitter in the unit and minimizing inverse and negative antenna feedback.

Another object of the present invention is to provide built in discrimination of metal objects as copper, silver, gold and stainless steel by a more responsive meter reading to such resistant metals.

In accordance with one aspect of the present invention, combination, it is provided an infrared wireless digital meter from very sensitive FM receiver, which comprises a sealed aluminum radiation shield, a dielectric container within the radiation shield, a krypton bulb 100 times brighter than a regular incandescent bulb within the dielectric container and bulb connected to + and − of the headphone/earphone jack on the FM receiver. The infrared phototransistor detector is on the other end of dielectric container cover and radiation shield with a 1.5 volt AA battery between the infrared phototransistor detector and meter for detecting heat and light changes from the krypton bulb.

In accordance with another aspect of the present invention further objects as mentioned above are accomplished basically by a 12¼ by 12 inch modified loop and full circle non-directional antenna system, with a full curve antenna on top of full circle and loop antennas at crossover points, mounted on a wood frame for search/pass 1 to 5 inches above the ground.

The system of the present invention is very light in weight in comparison to other detectors. The system provides a combination of all instruments clustered down in front by antenna system, near the ground. The system provides a very high speed, rapid search with minimum interference from other environmental influences and a very deep detection with built in metal discrimination from the (VHF)-FM propagated radio waves several hundred feet deep in the ground or less.

Other objects and features and advantages will appear from the drawings and descriptions hereinafter given.

DESCRIPTION OF THE PREFERRED EMBODIMENT

Figure 1:
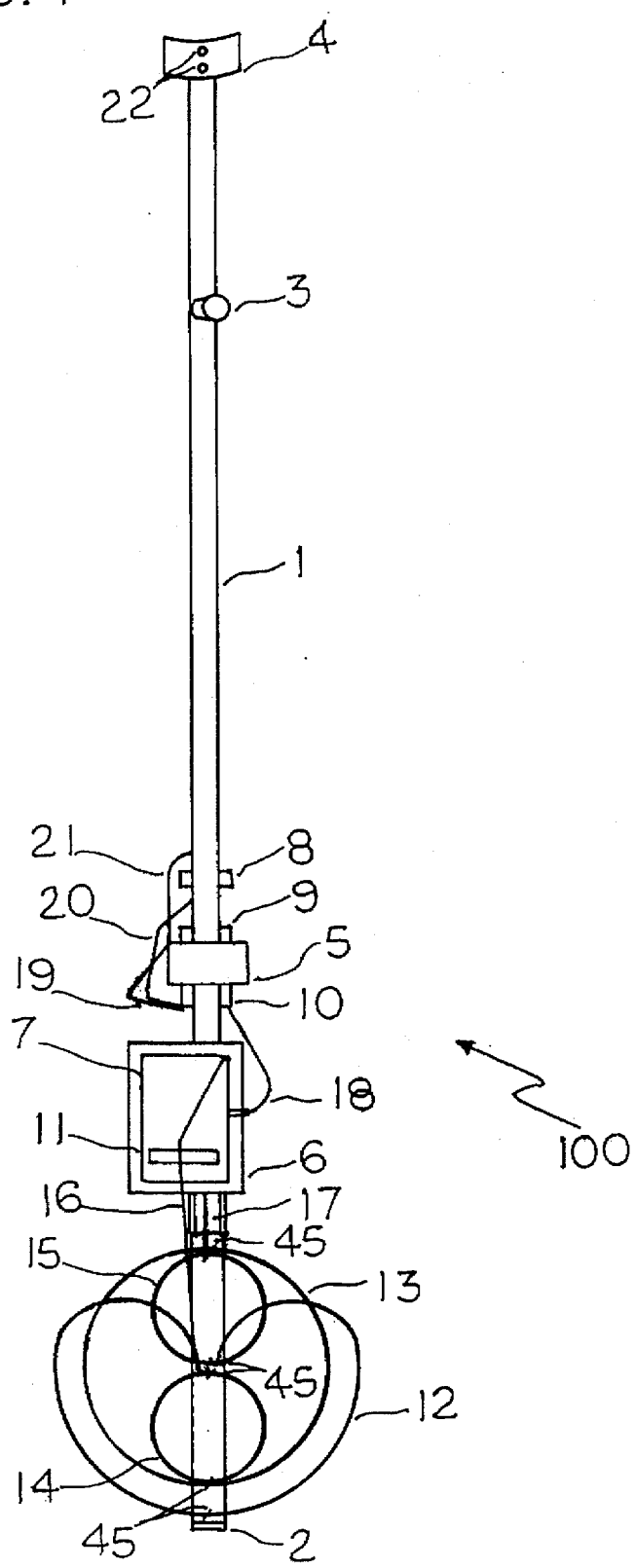
FIG. 1 is a top plan view showing essential features of my invention.

In FIG. 1, there is shown from the drawing an FM (VHF) infrared wireless digital metal detector System 100, which comprises a clustered combination of all detection instruments on the lower end of main member 1 and 2. System 100 which comprises an antenna system 12¼ by 12 inches consisting of a modified loop 14 and 15, a full circle non-directional antenna 13 and a full curve antenna 12 connected to each loop 14 and 15 at midsection. The full curve antenna 12 is on top of full circle antenna 13 and loop 15 at crossover. These are mounted on a wood frame 2 with staples 45.

Figure 2:
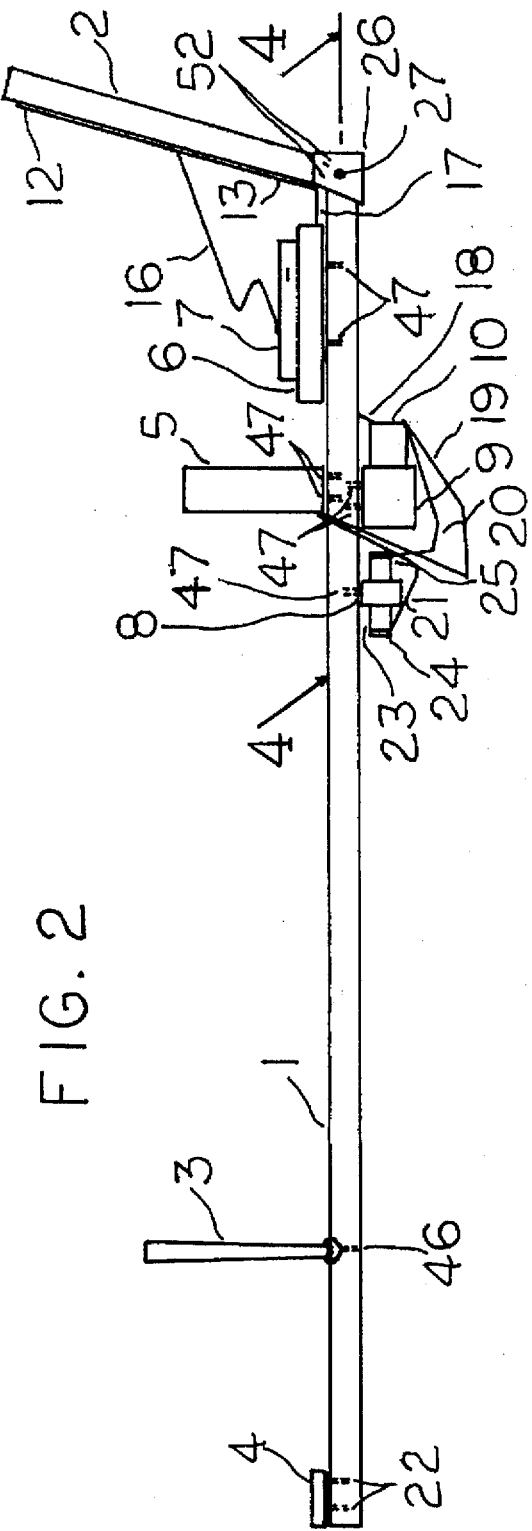
FIG. 2 is a right elevational view showing radiation shield and other essential features of my invention.

The wood frame 2 is stapled 52 through a plastic shoe 26 FIG. 2 and connected to main wood member 1 FIG. 1 by pin 27 FIG. 2.

The main wood member 1 FIG. 1, has all other detection instruments mounted on lower end in a cluster near the ground. The FM receiver case 6 is mounted by 2 screws 47 FIG. 2, and contains styrofoam 11 FIG. 1, as a shock absorber. The upper loop 14 separated by ⅜ of an inch from loop 15 is overlapped ½ inch over loop 15, where a copper strand wire 16 is connected and wire 16 connects to far end of FM receiver 7 antenna by wrapping tightly 7 or 8 times. A copper strand antenna wire 17 connects full circle antenna 13 to closest antenna mount on receiver 7 and is locked in by folding receiver antenna tight with wire 17 through pivot hinge area.

Figure 3:
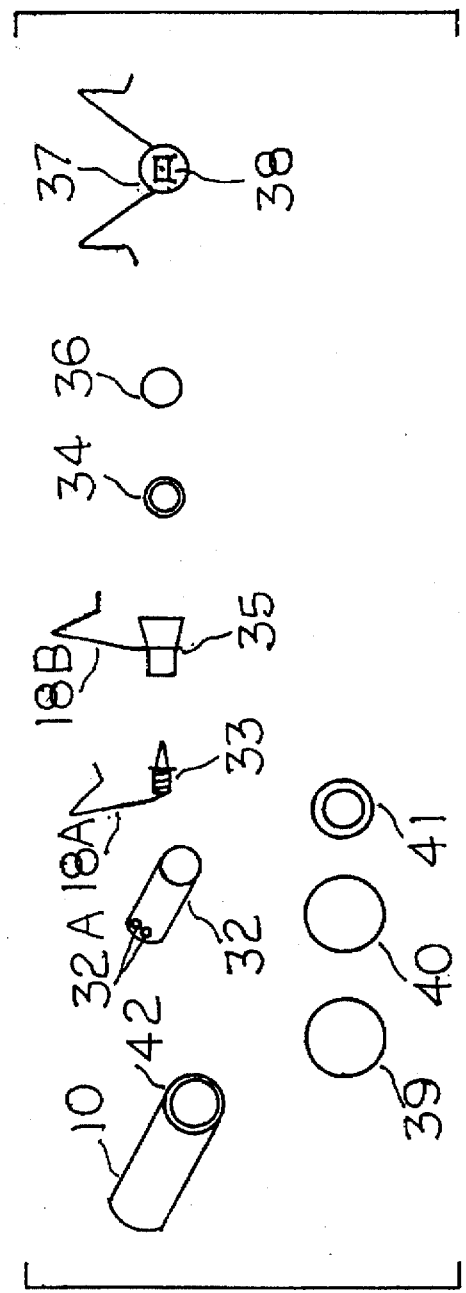
FIG. 3 is a exploded view to show the relationship or order of assembly of various parts of the radiation shield and infrared system.

In FIG. 1, the infrared unit 9 and 10 comprising a plastic mounting bracket 9 mounted by 2 screws 47 FIG. 2 and a sealed aluminum radiation shield 10 FIG. 2 and FIG. 3. The sealed aluminum radiation shield 10 contains a plastic case 32 and 37 FIG. 3, to further eliminate radiation contamination of response. The case further acts as means to reduce saturation of infrared radiation, and the cap 37 as a semi-reflector.

The dielectric case 32 is black and cap 37 is a light grey. The dielectric case 32 contains a 1½ volt krypton bulb 33 FIG. 3, which is 100 times brighter than the ordinary incandescent bulb and has a wire 18A soldered to + point for positive contact and krypton bulb is inserted into spring tension area of holder and reflector 35. The holder and reflector 35 has a spring tension area on the outside where negative wire 18B is inserted and held tightly. The holder and reflector 35 is pushed into head 34 which also has a plastic lens 36 to keep the krypton bulb 33 clean. The positive wire 18A and negative wire 18B feeding krypton bulb 33 are brought out through the bottom holes 32A of dielectric case 32 and up the outside of dielectric case 32 but still inside shield 10 and through wire slit 42 in the aluminum radiation shield 10. The grey plastic cap 37 has a infrared phototransistor detector 38, a two pin (maximum $I_c$ collector current of 25 mA) mounted by two wires soldered to pins of detector 38 and through cap 37 so as to keep detector 38 eye on krypton bulb 33 and semi reflective cap 37 also acts to eliminate infrared saturation of the infrared phototransistor detector 38. The size of the dielectric case 32 is a 35 MM film canister. The + and − wires are laid out on top of cap 37 and through wire slit 42 and then 2 aluminum foil caps 39 and 40 a ¼ larger than shield 10 are inserted on top of cap 37 to seal radiation out and a aluminum cap 41 is inserted on top of foil caps 39 and 40 to assure a positive radiation-shield. Shield cap 41 is inserted into shield 10 to retain cap 41 and edge of radiation shield 10 is pushed down on shield cap 41.

Figure 4:
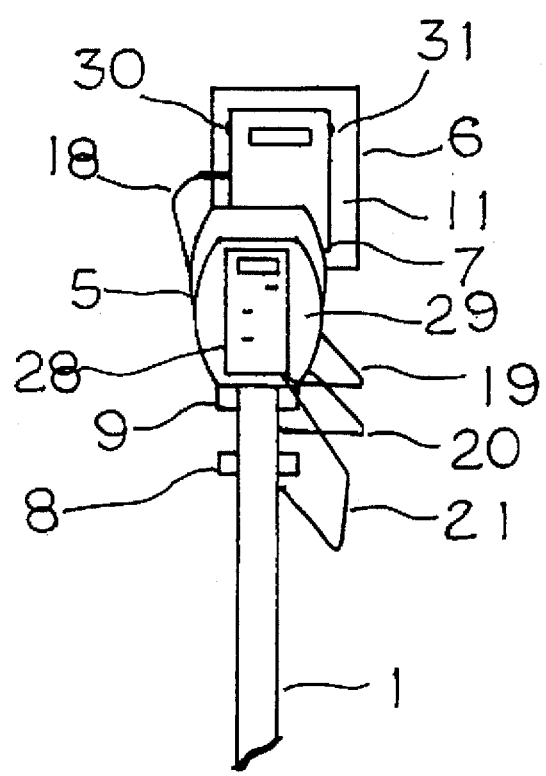
FIG. 4 is a perspective sectional view taken along the line 4—4 of FIG. 2.

The digital meter case 5 is mounted by 2 screws 47 FIG. 2, and a styrofoam shock absorber 29 FIG. 4 is inserted into the meter case 5 and digital meter 28 FIG. 4 sits against styrofoam 29 with double faced tape. The digital meter contains two 1½ volt button batteries.

In front of the radiation shield 10, on the lower side a battery case 23 is contained in a plastic mount 8 FIG. 1, mounted by 2 screws 47 FIG. 2 and has 2 end caps 24 and 25 FIG. 2, with spring copper for contact with a 1½ volt AA battery. The negative AA battery contact goes to the negative meter wire 21 and the positive battery contact wire 20 goes to the infrared phototransistor detector 38+. The positive meter wire 19 is connected to the other side of the infrared phototransistor detector 38.

The krypton bulb 33 is connected by wire 18A FIG. 3, positive and 18B negative which are connected to the receiver 7 headphone/earphone wire 18 FIG. 1.

The digital meter 28 is turned on and used on DC millivolts. The receiver 7 is turned on all the way dial 30 FIG. 4 and then adjusted by tuner 31 FIG. 4 so that the digital meter is at 0 to 35 millivolts. In testing the instrument 18 tuning areas were used in 1½ hour testing practice and an extremely excellent response to 7 or 8 different underground metal objects was achieved. The instrument also picked up a pipe 7 ft. deep and registered 1545 millivolts from base 0.

The arm support 4 FIG. 1, is mounted by 2 screws 22 and the instrument has a handle 3 mounted by a 3/16 inch metal pin 46 all the way through main member 1. The weight of the instrument was 1¼ pounds on a bathroom scale which is extremely light in weight.

As being apparent from the foregoing discription the FM (VHF) infrared wireless digital metal detector according to the present invention has features which make it very efficient, extremely powerful, sensitive, and a very deep detection product.

What is claimed is:

1. An FM (VHF) infrared wireless digital metal detector comprising a clustered instrument combination down in front of the metal detector unit, near the ground comprising:

an infrared phototransistor detector;

a sealed aluminum radiation shield surrounding said infrared phototransistor so that environmental radiation will not affect said infrared phototransistor detector;

a krypton bulb, said bulb being 100 times brighter than a conventional incandescent bulb;

a receiver connected to said krypton bulb, said receiver for detecting data by heat, infrared and light generated by said krypton bulb, said receiver relaying the detected data to a headphone/earphone jack;

a black plastic dielectric case and a semi reflective cap for eliminating saturation of said infrared phototransistor detector;

a meter mounted down in front of an antenna within said clustered instrument combination wherein said detection data is relayed to said meter from said infrared phototransistor detector and from said krypton bulb source.

\* \* \* \* \*